United States Patent [19]
Cradeur

[11] Patent Number: 4,666,365
[45] Date of Patent: May 19, 1987

[54] TUBE BUNDLE PULLING APPARATUS
[75] Inventor: Robert R. Cradeur, Sulphur, La.
[73] Assignee: Bon Ton Rolle Limited, Houston, Tex.
[21] Appl. No.: 553,399
[22] Filed: Nov. 18, 1983
[51] Int. Cl.⁴ .......................... B60P 1/00; B66F 11/00
[52] U.S. Cl. .................... 414/746; 414/546; 414/501
[58] Field of Search ............... 414/746, 747, 541, 547, 414/540, 542, 546, 680, 688, 718, 722, 708, 687, 686, 690, 692, 14, 16, 17, 20, 145, 501; 198/485, 750; 74/102, 519, 523; 212/184, 261, 264; 165/76

[56] References Cited
U.S. PATENT DOCUMENTS

| | | | |
|---|---|---|---|
| 199,836 | 1/1878 | Lawrence | 74/102 |
| 1,317,504 | 9/1919 | Keith | 414/734 |
| 2,550,185 | 4/1951 | Busch | 414/541 |
| 2,730,320 | 1/1956 | Srader | 248/647 |
| 2,990,072 | 6/1961 | Mindrum | 414/708 |
| 3,121,499 | 2/1964 | Barre, Jr. | 414/590 X |
| 3,174,634 | 3/1965 | Peck | 414/541 |
| 3,180,498 | 4/1965 | Postlewaite | 414/746 |
| 3,232,460 | 2/1966 | Rouse | 414/547 |
| 3,239,076 | 3/1966 | Huff et al. | 414/746 |
| 3,239,077 | 3/1966 | Huff et al. | 414/746 |
| 3,257,001 | 6/1966 | Postlewaite et al. | 414/746 |
| 3,335,879 | 8/1967 | Shaffer | 414/541 |
| 3,452,887 | 7/1969 | Larson et al. | 414/745 X |
| 3,468,439 | 9/1969 | Olitsky et al. | 414/532 |
| 3,510,012 | 5/1970 | Van Meteren | 414/746 |
| 3,567,044 | 3/1971 | Travis | 414/746 |
| 3,616,728 | 11/1971 | Kennedy | 212/268 X |
| 3,658,191 | 4/1972 | Murphy | 414/746 |
| 3,685,673 | 8/1972 | Schweis | 414/547 |
| 3,726,421 | 4/1973 | Goldhofer | 414/547 |
| 3,765,544 | 10/1973 | Murphy | 414/746 |
| 3,836,015 | 9/1974 | Travis | 414/746 |
| 3,836,025 | 9/1974 | Olson et al. | 414/547 |
| 3,954,187 | 5/1976 | van der Woerd | 414/746 |
| 3,958,698 | 5/1976 | van der Woerd | 414/746 |
| 4,042,116 | 8/1977 | Bertolino | 414/747 |
| 4,172,688 | 10/1979 | Cecchi et al. | 414/747 |
| 4,199,299 | 4/1980 | Petitto, Sr. | 414/687 |
| 4,227,854 | 10/1980 | Coffey | 414/746 |
| 4,274,796 | 6/1981 | Phillips | 414/690 |
| 4,280,783 | 7/1981 | Hayward | 414/686 |
| 4,306,832 | 12/1981 | Schmiesing | 414/718 |
| 4,323,398 | 4/1982 | Simon | 134/18 |
| 4,382,743 | 5/1983 | Newell | 414/692 |
| 4,392,524 | 7/1983 | Bauch | 165/76 |

Primary Examiner—Leslie J. Paperner
Assistant Examiner—Lyle Kim
Attorney, Agent, or Firm—John R. Kirk, Jr.

[57] ABSTRACT

A device and method for removing and reinstalling tube bundles from and into heat exchanger shells. The device features a portable base with a pivotally mounted vertical telescoping column. A bundle support member is movably attached to one side near the top of the telescoping column. A carriage which is connected to the tube bundle is driven along the bundle support member thereby extracting or inserting the tube bundle. An off-loading mechanism comprising a pair of telescoping masts pivotally mounted to the bundle support member and having a boom pivotally mounted at the top of said masts can be used to transfer a tube bundle from the bundle support member to an adjacent bundle dolly. The masts feature a linkage which is attached to the boom thereby pivoting the boom as the telescoping masts are raised or lowered.

36 Claims, 4 Drawing Figures

TUBE BUNDLE PULLING APPARATUS

TECHNICAL FIELD OF THE INVENTION

The field of this invention relates to methods and apparatuses used for removing tube bundles from heat exchangers and reinstalling tube bundles into heat exchangers.

PRIOR ART

Shell and tube exchangers are manufactured in a variety of designs for use throughout the refining, chemical, petrochemical and other industries. One design features a removable tube bundle, thereby allowing access to the outside of the tubes for cleaning should the material flowing through the shell of the exchanger foul the outer surface of such tubes. In order to maintain the performance of a heat exchanger at close to design values, the tube bundles are periodically removed and the fouling layer deposited on the outside and/or the inside of such tubes is removed. The tube bundles vary in diameter and length and some of the larger tube bundles can be as large as four and one half feet in diameter and twenty feet long and weigh as much as 40,000 pounds.

The tubes in the bundle may either be straight cut or U-shaped. The tube ends terminate in a tubesheet which is a highly machined thick disc of steel or alloy material which may also be drilled to be bolted up to a flange on the heat exchanger shell. Typically, a tubesheet is bolted between the heat exchanger shell flange and an end cap, although other designs are possible.

One prior art device described as a bundle puller manufactured by Hydro-Extractors, Inc. features a device that is positioned next to an exchanger with a crane. The bundle puller has an elongated support with a long stroking hydraulic cylinder mounted thereto. The elongated support is slidably mounted on a frame and can be secured in any offset position along that frame. The end of the piston is secured to the tubesheet for pulling the bundle from the exchanger.

This device presents several drawbacks. Since tube bundles may be as long as twenty feet or more, it is not practical to provide a hydraulic cylinder with such a long stroke. Therefore, the devices of the prior art provided a hydraulic cylinder with a shorter stroke, about four feet, which requires that after each piston stroke, pulling the bundle out another four feet, the slidable support must be disconnected and reconnected from the frame before the hydraulic cylinder can pull the bundle out another four feet. The presence of hydraulic cylinders with such long stroke adds significant bulk to the device. Moreover, once the bundle is loaded onto the device, and before the device can be disconnected from a structure or the exchanger shell, there is always the problem that the tube bundle may not be properly centered on the device. Therefore, additional manpower is required to ensure that the device, with the bundle attached thereto, can hang perfectly level so that the bundle may safely be brought to the ground. Finally, after the tube bundle is withdrawn, it must be loaded on a truck or carried by the crane to a cleaning location. The tube bundle must be carried transverse to the direction of travel of the crane in order to allow the crane to properly support the heavy bundle without tipping over. Therefore, a wide path must exist from the point where the tube bundle is removed from the heat exchanger shell to the point where it is to be loaded on a truck to be driven to a cleaning station or for the crane itself to drive to the cleaning station while supporting the tube bundle.

A similar device to that discussed above can be found in the Srader U.S. Pat. No. 2,730,320 issued Jan. 19, 1956.

Another prior art device is described in the Bauch U.S. Pat. No. 4,392,524 issued July, 1983. The Bauch device features a self-propelled chassis including a rotatably mounted vertical telescoping shaft with a bundle support member mounted to one side. A carriage, driven by four hydraulic motors along a rack, moves along the bundle support member and when attached to the tube bundle thereby pulls the bundle from the shell. Although the Bauch device can be used to remove a tube bundle from a shell, it does not obviate the need for a crane to be standing by in order to off-load or load the tube bundle from or to the bundle support member. Therefore, to a great extent, the economies achieved by using the Bauch device to remove a bundle from an exchanger are lost because a crane and crew must also be used before the recently removed bundle can be off-loaded onto a truck for transport to the tube cleaning station. Without a crane or the offloading device of the combination of this invention, transporting the bundle to and from the clearing station would require tying up the bundle pulling machine for an inordinate period of time resulting in inefficiency of operation.

Furthermore, as frequently occurs during refinery turnarounds, a great many exchangers are scheduled to have their tube bundles removed within a short period of time. In addition, during such turnarounds, a crane of the appropriate size and capacity may be tied up on other jobs. There may be so much activity around the heat exchanger whose bundle is to be pulled related to the turnaround, that making room for crane access may further increase the time required to complete the turnaround.

The apparatus and method of the present invention does not envision the use of a separate crane in order to transport a bundle to the tube cleaning station. Instead, the off-loading and reloading mechanism provided with the device of the present invention permits the recently removed bundle to be transferred to and from a bundle dolly whereupon it may be towed to the tube cleaning station with a light truck or similar vehicle. Therefore, the device of the present invention may be immediately redeployed for removal of yet another tube bundle thereby increasing the usefulness of the device as well as reducing the overall length of a turnaround.

SUMMARY OF THE INVENTION

The invention encompasses a device and a method for removing and reinstalling tube bundles from and into heat exchanger shells. The device features a portable base with a pivotally mounted vertical telescoping column. A bundle support member is attached to one side near the top of the telescoping column. A carriage, which is connected to the tube bundle, is driven along the bundle support member thereby extracting or inserting the tube bundle as desired.

Having fully removed a bundle from the shell of the exchanger onto the bundle support member, the off-loading mechanism picks up the bundle and loads it onto a bundle dolly so that it may be driven to a tube cleaning station. The off-loading mechanism comprises a pair of telescoping masts, with each mast being pivotally mounted from the bundle support member and further containing a lower, an upper and at least one intermediate section. A linkage connects the intermediate section with a boom pivotally mounted on the telescoping mast upper section. A stabilizer member serves as the pivot point between the boom and the mast upper section as well as to stabilize the off-loading mechanism by connecting the two upper sections together. By manipulating the hydraulic cylinders provided with the off-loading mechanism, the boom can be raised or lowered and both masts pivoted about their lower sections thereby permitting the bundle to be removed from the bundle support member and loaded on to a bundle dolly, or vice versa.

DESCRIPTION OF THE PREFERRED EMBODIMENT

Figure 1:
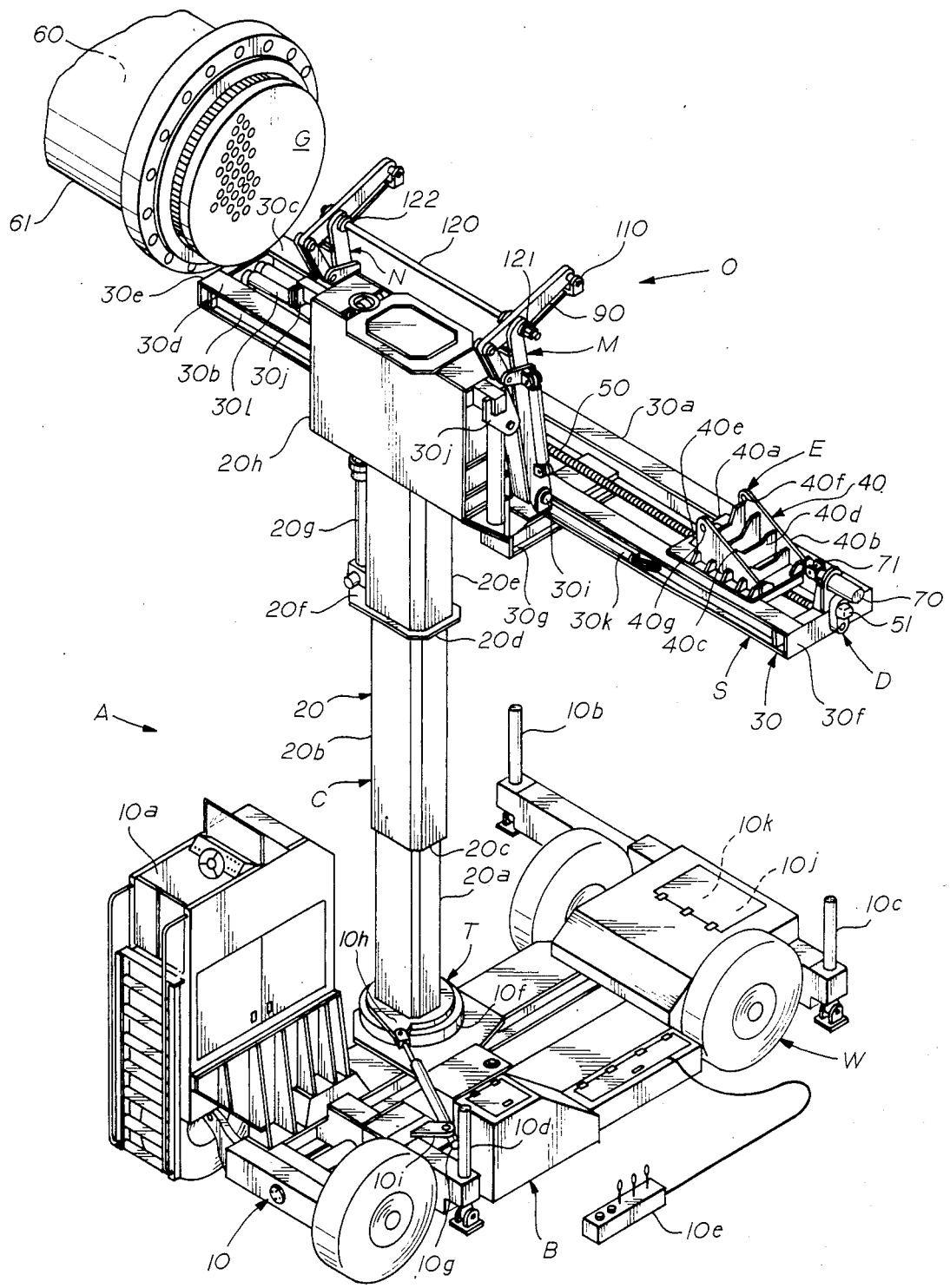
FIG. 1 is an isometric view showing the apparatus with the telescoping column fully extended and the carriage in the position it would be in before removing the tube bundle from an exchanger.

By way of definition, it is to be understood in the foregoing that references to hydraulic cylinders encompass the pistons included therein including all necessary controls and connecting lines required to make such cylinders operational. The hydraulic cylinders and the controls as used in this invention are of a type well known in the art.

The bundle pulling apparatus A is composed of the following elements: a base B; a rotatably mounted vertical telescoping column ("column") C; a turntable T connecting telescoping column C to base B; a bundle support member S mounted to one side of telescoping column C near its top; a carriage E driven by carriage drive means D along bundle support member S; and an off-loading mechanism O for loading a tube bundle 60 onto bundle dolly H from bundle support member S and vice versa.

The base B also numbered 10 is self-propelled, containing an engine 10j and four wheels W as well as a steering compartment 10a. A self propelled base is illustrated as the preferred embodiment although a non-self propelled frame suitable for mounting to a vehicle is within the spirit of the invention. The engine 10j drives a hydraulic pump 10k which provides hydraulic fluid pressure to the various hydraulic cylinders on the bundle pulling apparatus A. The base 10 also contains four temporary supports of which three 10b, 10c and 10d are shown. When using the bundle pulling apparatus, the temporary supports are lowered to the point where they fully support the base 10 thereby taking the weight of the base off the wheels W. The bundle pulling apparatus A may be operated from the steering compartment 10a or by an operator standing on the ground using remote control 10e. A self-propelled base is described by way of example as a base mounted on wheels that is towed into position does not depart from the spirit of the invention.

As shown in FIG. 1, turntable T, also numbered 10f, is mounted onto base 10. Column C is mounted to the top of turntable 10f. Turntable hydraulic cylinder 10g connects turntable bracket 10h to base bracket 10i. Therefore, turntable hydraulic cylinder 10g, when actuated, is capable of rotating turntable 10f through an angle of approximately 105°. As is readily apparent, turntable hydraulic cylinder 10g is used to retain column C in a given position after an initial rotation.

The base 10 of the bundle pulling apparatus A is placed into position and temporary supports 10b, 10c and 10d lowered thereby securing the base 10. Column C also numbered 20 is then extended. Column 20 has a column lower section 20a which is connected to the top of turntable 10f and extends into the first column intermediate section 20b. First column intermediate section 20b at its lower end 20c telescopes over column lower section 20a. At its upper end 20d, first column intermediate section 20b telescopes into a second column intermediate section 20e. Flange 20f is connected to the lower end of second column intermediate section 20e. A column hydraulic cylinder 20g is connected between flange 20f and column upper section 20h on the outside of second column intermediate section 20e. Column upper section 20h is extended relative to second column intermediate section 20e via column hydraulic cylinder 20g. When column hydrualic cylinder 20g is in its fully contracted position, column upper section 20h has been lowered to the point where it rests on flange 20f.

Referring to FIG. 1, it can be seen that bundle support member S, also numbered 30, is connected to column upper section 20h and mounted to one side of the column 20. Bundle support member 30 is fabricated using two parallel structural members 30a and 30b each having an upper planar surface 30c and 30d, respectively. The parallel structural members 30a and 30b are connected to each other by front end member 30e and back end member 30f. The bundle support member 30 is supported to one side of rotatably mounted telescoping column 20 by two support members 30g (only one being visible in FIG. 1) extending horizontally from column upper section 20h in a direction perpendicular to the longitudinal horizontal axis of bundle support member 30. Guides, not shown, are provided with support members 30g to guide horizontal motions of the bundle support member 30 relative to column 20 as more fully described hereinbelow. A pivotal connection 30i is attached to each bundle support member 30g. Off-loading mechanism O is pivotally connected to support members 30g via pivotal connections 30i as more fully described hereinbelow. A pair of gussets 30j extend from column upper section 20h and provide an additional mounting point for off-loading mechanism O as more fully described hereinbelow.

Bundle support member 30 is slidably mounted on support members 30g so that front end member 30e can be moved in close proximity with the heat exchanger shell 61, whose bundle 60 is to be removed or installed. Alignment hydraulic cylinder 30k is connected between bundle support member 30 and column upper section 20h for horizontal translational movements of the bundle support member 30 along its longitudinal axis relative to column 20.

A pair of frame mounted rollers 301 are mounted within bundle support member 30 adjacent to front end member 30e and at the opposite end of bundle support member 30 from where carriage drive means D are mounted. Frame mounted rollers 301 are disposed to be extended upwardly above upper planar surfaces 30c and 30d through the action of a pair of hydraulic cylinders (not shown). The frame mounted rollers have a longitudinal axis parallel to the horizontal longitudinal axis of bundle support member 30. After the carriage E has pulled a substantial portion of a tube bundle 60 from within the heat exchanger shell 61, frame mounted rollers 301 are extended to support the tube bundle 60 as its back end is withdrawn from the exchanger shell. The frame mounted rollers 301 prevent any damage to the tube ends by supporting the bundle so that it doesn't drop as the tube ends clear the end of the heat exchanger shell.

Referring to FIG. 1, carriage E, also numbered 40, has a base plate 40a which bears directly on upper planar surfaces 30c and 30d. Extending vertically from base plate 40a are two vertical members 40b and 40c. Vertical support members 40b and 40c are mounted in a plane parallel to the direction of motion of carriage 40 along bundle support member 30. A series of vertically mounted parallel stiffeners 40d extend between vertical support members 40b and 40c. A pair of fixed rollers 40e having a longitudinal axis parallel to the longitudinal axis of bundle support member 30 are mounted on the carriage 40 in front of stiffeners 40d and adapted to extend through base plate 40a, for supporting tubesheet G of the tube bundle 60. Pulling eyes 40f and 40g are used to initially remove a tube bundle 60 a few feet from the exchanger shell 61 via a cable (not shown) attached between eyes 40f and 40g and the tubesheet G. A stop (not shown) is provided on base plate 40a to engage the tubesheet G and retain it on fixed rollers 40e when the carriage 40 pulls the tube bundle 61 out of the exchanger. The underside of carriage 40 is adapted to engage rotatably mounted threaded shaft 50 via a mechanism well known in the art so that rotation of said shaft 50 is translated to horizontal motion of carriage 40 along bundle support member 30 as more fully discussed hereinbelow.

Carriage drive means D includes hydraulic drive motor 51 and rotatably mounted threaded shaft 50. Hydraulic drive motor 51 is mounted to the outside of back end member 30f and integrally geared to rotate threaded shaft 50 so that carriage 40 advances along bundle support member 30 at a speed of up to 6 feet per minute. Rotatably mounted threaded shaft 50 is mounted parallel to the longitudinal horizontal axis of bundle support member 30 and located within bundle support member 30 between structural members 30a and 30b. Rotatably mounted threaded shaft 50 extends for substantially the entire length of bundle support member 30.

Under certain conditions, due to accumulations of muck inside the shell, it may be difficult to obtain initial releasable movement of the tube bundle 60 from the heat exchanger shell 61. Should this condition arise, bundle breakout hydraulic cylinder 70 can be used to initially loosen the bundle 60 within the shell 61. Fastening means 71 connected to bundle breakout hydraulic cylinder 70 are used to connect the tubesheet G to the bundle breakout hydraulic cylinder 70 via a suitable sling (not shown). In order to use bundle breakout hydraulic cylinder 70, front end member 30e of bundle support member 30 is moved horizontally using alignment hydraulic cylinder 30k until it comes in contact with a fixed object thereby stabilizing the bundle pulling apparatus A while bundle breakout hydraulic cylinder 70 is actuated to loosen the tube bundle 60 from the exchanger shell 61.

After withdrawing the tube bundle 60 from the exchanger shell, the tube bundle is lowered by initially lowering column upper section 20h by retracting column hydraulic cylinder 20g. Another hydraulic cylinder located inside column 20 (not shown) is used to lower second column intermediate section 20e over first column intermediate section 20b as well as to lower first column intermediate section 20b over column lower section 20a. At the same time as column 20 is being retracted, turntable hydraulic cylinder 10g can be used to rotate column 20 thereby aligning the longitudinal axis of bundle support member 30 with the longitudinal axis of base 10. It is to be understood that the previously described lowering functions can occur in any order the operator so chooses by using remote control 10e or the controls mounted in steering compartment 10a. Having aligned the longitudinal axes of bundle support member 30 and base 10 and fully retracted column 20, bundle support member 30 will be virtually in contact with base 10.

Having fully lowered the bundle support member 30 with tube bundle 60 supported therefrom, off-loading mechanism O of this invention is used to transfer tube bundle 60 from bundle support member 30 to bundle dolly H. The off-loading mechanism O contains a first telescoping mast M and a second telescoping mast N (see FIG. 1). First telescoping mast M is identical in function to second telescoping mast N with the only difference being the placement of actuating hydraulic cylinders as more fully discussed hereinbelow. Therefore, the foregoing discussion, while directed at first telescoping mast M is intended to apply to second telescoping mast N unless otherwise stated.

First telescoping mast M also numbered 80 contains a lower section 80a, an intermediate section 80b and an upper section 80c. Upper section 80c telescopes from within intermediate section 80b. Intermediate section 80b telescopes from within lower section 80a. Lower section 80a is pivotally connected via pivotal connection 30i to support member 30g (see FIG. 1).

First telescoping mast 80 can be raised by using first hydraulic cylinder 80d and second hydraulic cylinder 80e. First hydraulic cylinder 80d is connected to lower section 80a and to intermediate section 80b at gusset 80f. Therefore, actuation of first hydraulic cylinder 80d raises intermediate section 80b and upper section 80c relative to lower section 80a. However, first hydraulic cylinder 80d does not impart any relative telescoping movement between intermediate section 80b and upper section 80c. A second hydraulic cylinder 80e is mounted inside first telescoping mast 80 and connected between intermediate section 80b and upper section 80c. Therefore, upper section 80c may be telescoped relative to intermediate section 80b by using second hydraulic cylinder 80e.

Figure 3:
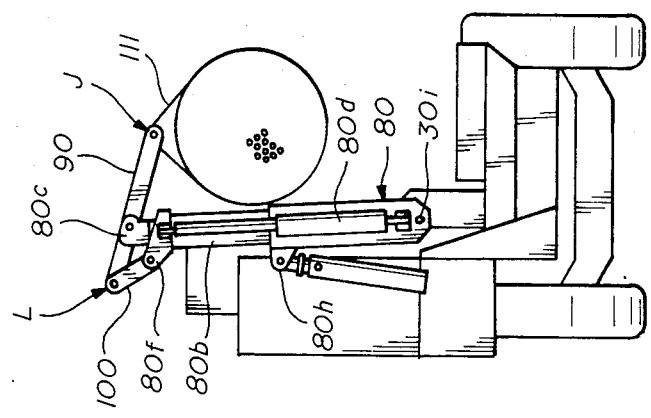
FIG. 3 is a schematic of a side elevation of the off-loading mechanism showing the intermediate section extended thereby raising the bundle.
Figure 2:
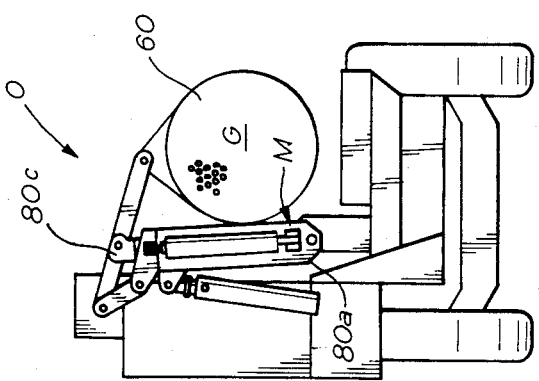
FIG. 2 is a schematic of a side elevation of the off-loading mechanism in a fully contracted position.

A boom 90 is pivotally mounted to the top of upper section 80c as more fully described hereinbelow. A linkage L comprising of rigid link 100 is pivotally connected at both ends to boom 90 and to gusset 80f which is rigidly connected to intermediate section 80b. Securing means J is located at the opposite end of boom 90 from the point where link 100 is pivotally connected thereto. Securing means J includes a shackle 110 (see FIG. 1) and a sling 111 which encircles tube bundle 60 and is secured to shackle 110. As can readily be seen from FIGS. 3 and 4, when the second hydraulic cylinder 80e is actuated to extend upper section 80c from intermediate section 80b, rigid link 100 exerts a downward force on boom 90 thereby pivoting boom 90 about pivotal connection 90a which in turn raises shackle 110 along with tube bundle 60 attached thereto via sling 111.

Figure 4:
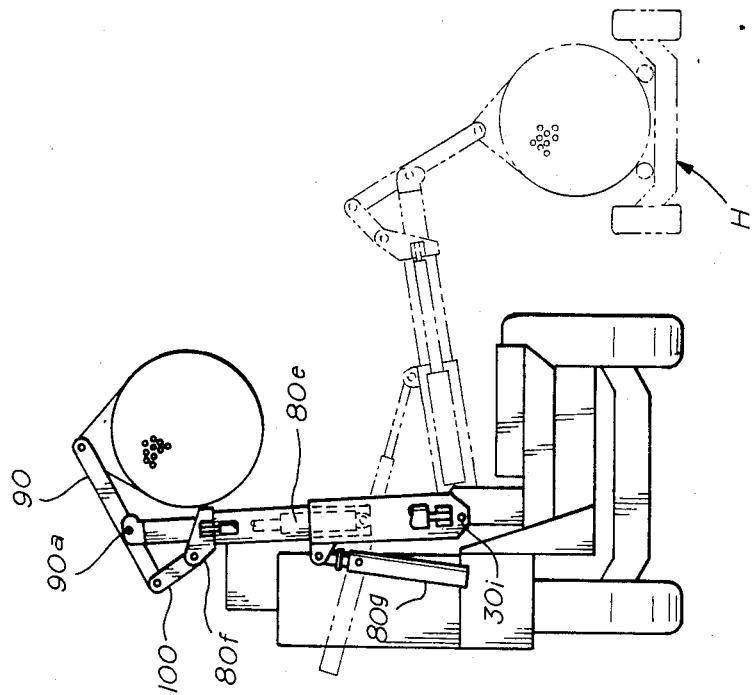
FIG. 4 shows a schematic of the off-loading mechanism in two positions. The first position illustrates the upper section being extended thereby actuating the linkage and raising the boom. The second position shows the entire telescoping mast pivoted about the lower section thereby transferring the tube bundle to the bundle dolly.

The first telescoping mast 80 is pivoted about pivotal connection 30i via a third hydraulic cylinder 80g (see FIG. 4). The third hydraulic cylinder 80g is pivotally mounted between gusset 30j (see FIG. 1) and gusset 80h mounted near the top of lower section 80a. As seen in FIG. 4, actuation of third hydraulic cylinder 80g pivots first telescoping mast 80 thereby setting tube bundle 60 onto bundle dolly H. It should be noted that first hydraulic cylinder 80d, second hydraulic cylinder 80e and third hydraulic cylinder 80g can be operated in any order chosen by the operator either simultaneously or serially by manipulation of controls located in steering compartment 10a or using remote control 10e. As can be readily appreciated by one skilled in the art, first telescoping mast 80 is adapted to raise the tube bundle 60 vertically using first hydraulic cylinder 80d. The tube bundle 60 can be further raised vertically using second hydraulic cylinder 80e via linkage L thereby raising the shackle 110 on boom 90. Finally, the tube bundle can be set into bundle dolly H using third hydraulic cylinder 80g to pivot first telescoping mast 80.

As stated hereinabove, off-loading mechanism O contains a first telescoping mast M and a second telescoping mast N. A stabilizer member 120 (see FIG. 1) extends through a first circular opening 121 in upper section 80c of first telescoping mast M, as well as through a second circular opening 122 in upper section 80c of second telescoping mast N. Therefore, stabilizer member 120 serves not only a stabilizing function for off-loading mechanism O, but also as the shaft used in pivotally connecting a boom 90 to both first telescoping mast M and second telescoping mast N.

The bundle pulling apparatus A of the present invention is placed into service by driving the self-propelled base 10 from steering compartment 10a to a suitable location adjacent a heat exchanger whose bundle is to be removed or inserted. Temporary supports 10b, 10c and 10d are lowered to take the weight of the bundle pulling apparatus off of the wheels W. Column 20 is extended and rotated until the longitudinal axis of bundle support member 30 is aligned with the longitudinal axis of the heat exchanger and upper planar surfaces 30c and 30d are located just below tubesheet G of tube bundle 60. The tube bundle 60 is initially pulled from exchanger shell 61 using a cable (not shown) connected between pulling eyes 40f and 40g and tubesheet G. After pulling tube bundle 60 a few feet from the exchanger shell 61, the cable connecting pulling eyes 40f and 40g to the tubesheet G is released. The bundle support member 30 is then lowered slightly while the carriage 40 is advanced to a position as close as possible to front end member 30e. Using column 20 and alignment hydraulic cylinder 30k, the bundle support member 30 is positioned so that the tubesheet G comes to rest on fixed rollers 40e and is secured to the carriage 40 by a stop (not shown). Hydraulic drive motor 51 can then be actuated to continue removal of the tube bundle 60 from the heat exchanger shell 61. Just before the tube bundle 60 is fully removed from the shell, frame mounted rollers 301 are extended to support the end of tube bundle 60.

Having fully withdrawn tube bundle 60 from the heat exchanger shell, column 20 is rotated and retracted and alignment hydraulic cylinder 30h is actuated thereby bringing bundle support member 30 into virtual contact with base 10. Off-loading mechanism O via actuation of first, second and third hydraulic cylinders 80d, 80e and 80g respectively can then be used to transfer the tube bundle 60 from bundle support member 30 to bundle dolly H.

As can readily be appreciated, using the procedures described hereinabove, the bundle pulling apparatus A can be used to remove or insert a tube bundle 60 from or into a heat exchanger shell. Furthermore, the device of the present invention may also be used to remove end bells from a heat exchanger shell prior to removing the tube bundle 60.

The foregoing disclosure and description of the invention are illustrative and explanatory thereof, and various changes in the size, shape and materials, as well as in the details of the illustrated construction may be made without departing from the spirit of the invention.

I claim:

1. An apparatus for removing tube bundles of shell and tube heat exchangers, said bundles having a tubesheet on at least one end and said exchanger having at least one flanged end cap, comprising:
   a base, said base having a plurality of wheels thereby allowing placement of the apparatus adjacent to a heat exchanger;
   a vertical telescoping column rotatably mounted to and extending from said base, said column having a vertical axis, said column movable between an expanded and a retracted position;
   a bundle support member having a longitudinal horizontal axis mounted to said telescoping column at the side of said telescoping column and adapted for slidable movement along said longitudinal axis relative to said telescoping column;
   a carriage mounted with said bundle support member, said carriage adapted to receive the flanged end of a tube bundle and adapted to be driven horizontally along said bundle support member;
   means for displacing said carriage axially along said bundle support member;
   at least one telescoping mast;
   pivoting means mounted to said telescoping column for selectively pivoting said mast about said bundle support member;
   a boom pivotally connected to said mast;
   securing means on said boom for connecting a load to said boom;
   raising means for selectively extending or retracting said telescoping mast; and
   linkage means mounted to said mast for pivoting said boom about said mast when said raising means selectively extends or retracts an upper mast section.

2. The apparatus of claim 1, wherein said telescoping mast further contains:
   a lower section pivotally connected to said bundle support member;
   at least one intermediate section slidably mounted to selectively extend or retract from said lower mast section;

an upper section slidably mounted to selectively extend or retract from said intermediate mast section;
said boom is pivotally mounted to said upper section of said mast; and
said linkage means is mounted to said intermediate mast section.

3. The apparatus of claim 2, wherein:
said raising means includes at least one hydraulic cylinder.

4. The apparatus of claim 3, wherein said raising means includes:
a first hydraulic cylinder is connected between said lower section and said intermediate section for selectively extending and retracting said intermediate section from within said lower section; and
a second hydraulic cylinder is connected between said intermediate section and said upper section for selectively extending and retracting said upper section from within said intermediate section.

5. The apparatus of claim 4, wherein:
said pivoting means is a third hydraulic cylinder, said third hydraulic cylinder being pivotally connected to said bundle support member and said lower section of said mast.

6. The apparatus of claim 5, wherein:
said first hydraulic cylinder is mounted outside said mast; and
said second hydraulic cylinder is mounted inside said mast.

7. The apparatus of claim 6, wherein:
said linkage means is a linkage containing at least one rigid link wherein the ends of said linkage are pivotally connected to said intermediate section and to said boom, whereupon actuation of said second hydraulic cylinder said boom can be selectively pivoted about said upper section of said mast.

8. The apparatus of claim 7, further including:
a first telescoping mast;
a second telescoping mast; and
a stabilizer member, said stabilizer member connecting said upper section of said first telescoping mast to said upper section of said second telescoping mast.

9. The apparatus of claim 8, wherein:
said upper section of said first telescoping mast is formed having a first circular opening;
said upper section of said second telescoping shaft is formed having a second circular opening; and,
said stabilizer member extends through said first and second circular openings thereby serving as a shaft for pivotally mounting a boom to said upper mast section.

10. The apparatus of claim 9, wherein:
said securing means contains a shackle, said shackle located at the opposite end of said boom from where said linkage means is connected to said boom; and
said securing means further contains a sling, said sling adapted to encircle a heat exchanger bundle and to be secured to said shackle.

11. The apparatus of claim 2, including:
a first telescoping mast;
a second telescoping mast; and
a stabilizer member, said stabilizer member connecting said upper section of said first telescoping mast to said upper section of said second telescoping mast.

12. The apparatus of claim 11, wherein:
said upper section of said first telescoping mast is formed having a first circular opening;
said upper section of said second telescoping shaft is formed having a second circular opening; and,
said stabilizer member extends through said first and second circular openings thereby serving as a shaft for pivotally mounting a boom to said upper mast section.

13. The apparatus of claim 1, further containing:
a shackle, said shackle located at the opposite end of said boom from where said linkage means is connected to said boom; and
a sling, said sling adapted to encircle a heat exchanger bundle and to be secured to said shackle.

14. The apparatus of claim 1, wherein:
said carriage displacement means includes:
a rotatably mounted threaded shaft extending substantially the entire length of said horizontal longitudinal axis of said bundle support member and engaging said carriage;
a hydraulic motor mounted on said bundle support member for rotating said threaded shaft, thereby selectively driving said carriage along said bundle support member.

15. The apparatus of claim 14, wherein:
said bundle support member includes a pair of axially extending and spaced structural members, said members defining an upper planar surface on which said carriage is directly supported.

16. The apparatus of claim 15, wherein:
said threaded shaft is mounted within said bundle support member between said axially extending and spaced structural members.

17. The apparatus of claim 1, wherein:
said bundle support member further includes:
a pair of frame mounted rollers, said frame mounted rollers mounted within said bundle support member at one end of said bundle support member, said rollers having a central axis parallel to said longitudinal axis of said bundle support member, and said frame mounted rollers disposed to be extended from within said bundle support member thereby allowing said rollers to support a tube bundle at the opposite end from the end supported by said carriage.

18. The apparatus of claim 17, wherein:
said bundle support member further includes a bundle breakout hydraulic cylinder mounted above and on the opposite end of said bundle support member from said retractable rollers; and,
fastening means connected to said bundle breakout hydraulic cylinder for attachment to a tubesheet or an end cap of a heat exchanger for initially loosening said bundle from a heat exchanger shell.

19. The apparatus of claim 1, wherein said base further contains:
an engine to drive said base; and,
a hydraulic pump driven by said engine.

20. The apparatus of claim 1, wherein said bundle support member further contains:
an alignment hydraulic cylinder for selectively horizontally displacing said bundle support member to align said bundle support member adjacent to a heat exchanger for removing or installing a tube bundle.

21. The apparatus of claim 1, wherein:
a turntable is mounted to said base connecting said base and said telescoping column; and, a turntable hydraulic cylinder is connected between said base and said turntable for rotating said column through approximately 105° about its vertical axis.

22. The apparatus of claim 21, wherein:
said bundle support member can virtually rest on said base when said telescoping column is fully retracted and said longitudinal axis of said bundle support member is parallel to the longitudinal axis of said base.

23. A loading and unloading apparatus for use with heat exchanger bundles comprising:
a support member;
at least one telescoping mast;
pivoting means mounted to said support member for selectively pivoting said mast about said support member,
a boom pivotally connected to said mast;
securing means on said boom for connecting a load to said boom;
raising means for selectively extending or retracting said telescoping mast; and,
a linkage containing at least one rigid link mounted to said mast for pivoting said boom about said mast when said raising means selectively extends or retracts an upper mast section.

24. The device of claim 23, wherein said telescoping mast further contains:
a lower section pivotally connected to said support member;
at least one intermediate section slidably mounted to selectively extend or retract from said lower mast section;
an upper section slidably mounted to selectively extend or retract from said intermediate mast section;
said boom is pivotally connected to said upper mast section; and
said linkage is mounted to said intermediate mast section.

25. The apparatus of claim 24, wherein:
said raising means includes at least one hydraulic cylinder.

26. The apparatus of claim 25, wherein said raising means includes:
a first hydraulic cylinder is connected between said lower section and said intermediate section for selectively extending and retracting said intermediate section from within said lower section; and
a second hydraulic cylinder is connected between said intermediate section and said upper section for selectively extending and retracting said upper section from within said intermediate section.

27. The apparatus of claim 26, wherein:
said pivoting means is a third hydraulic cylinder, said third hydraulic cylinder being pivotally connected to said frame and said lower section of said mast.

28. The apparatus of claim 27, wherein:
said first hydraulic cylinder is mounted outside said mast; and,
said second hydraulic cylinder is mounted inside said mast.

29. The apparatus of claim 28, wherein:
said linkage contains one rigid link, wherein the ends of said linkage are pivotally connected to said intermediate section and to said boom, whereupon actuation of said second hydraulic cylinder said boom can be selectively pivoted about said upper section of said mast.

30. The apparatus of claim 29, including:
a first telescoping mast;
a second telescoping mast; and
a stabilizer member, said stabilizer member connecting said upper section of said first telescoping mast to said upper section of said second telescoping mast.

31. The apparatus of claim 30, wherein:
said upper section of said first telescoping mast is formed having a first circular opening;
said upper section of said second telescoping shaft is formed having a second circular opening; and,
said stabilizer member extends through said first and second circular openings thereby serving as a shaft for pivotally mounting a boom to said upper mast section.

32. The apparatus of claim 31, wherein:
said securing means contains a shackle, said shackle located at the opposite end of said boom from where said linkage means is connected to said boom; and
said securing means further contains a sling, said sling adapted to encircle a heat exchanger bundle and to be secured to said shackle.

33. The apparatus of claim 24, including:
a first telescoping mast;
a second telescoping mast; and
a stabilizer member, said stabilizer member connecting said upper section of said first telescoping mast to said upper section of said second telescoping mast.

34. The apparatus of claim 33, wherein:
said upper section of said first telescoping mast defines a first circular opening;
said upper section of said second telescoping shaft defines a second circular opening; and,
said stabilizer member extends through said first and second circular openings thereby serving as a shaft for pivotally mounting a boom to said upper mast section.

35. The apparatus of claim 23, further containing:
a shackle, said shackle located at the opposite end of said boom from where said linkage means is connected to said boom; and
a sling, said sling adapted to encircle a heat exchanger bundle and to be secured to said shackle.

36. A method of removing a tube bundle from a heat exchanger comprising the steps of:
positioning the bundle pulling apparatus, having a wheel mounted base, on the ground below and adjacent to a heat exchanger;
extending a telescoping column from said base;
rotating said telescoping column to align a longitudinal axis of a bundle support member connected to said column with the longitudinal axis of the exchanger;
moving the bundle support member along its longitudinal axis until an end of the bundle support member is adjacent the tube bundle to be pulled;
initially pulling the tube bundle from the heat exchanger shell via a carriage disposed to be driven along said bundle support member;
lowering said bundle support member thereby aligning a carriage supported by said bundle support member under a tubesheet of the heat exchanger tube bundle;
upwardly telescoping said column until said tubesheet is engaged by and secured in said carriage;

rotating a threaded shaft engaged to said carriage thereby translating said carriage relative to said bundle support member;

rotating said column to align the longitudinal axis of said bundle support member to the longitudinal axis of said base;

telescoping the column to lower said bundle support member down to said base;

securing a tube bundle to an off-loading mechanism mounted to said bundle support member;

telescoping a pair of masts in said off-loading mechanism thereby raising the tube bundle;

pivoting booms of said off-loading mechanism about said pair of telescoping masts via a linkage connected to each of said booms thereby further raising the tube bundle; and pivoting said pair of telescoping masts thereby setting the tube bundle into a bundle dolly.

* * * * *